US012674534B2

(12) United States Patent
Wan et al.

(10) Patent No.: US 12,674,534 B2
(45) Date of Patent: Jul. 7, 2026

(54) FLUID CONNECTOR

(71) Applicant: LOTES CO., LTD, Keelung (TW)

(72) Inventors: Lei Wan, Guangzhou (CN); Chih-Kun Chen, Keelung (TW); Wen-Cong Zhang, Guangzhou (CN)

(73) Assignee: LOTES CO., LTD, Keelung (TW)

( * ) Notice: Subject to any disclaimer, the term of this patent is extended or adjusted under 35 U.S.C. 154(b) by 0 days.

(21) Appl. No.: 19/023,980

(22) Filed: Jan. 16, 2025

(65) Prior Publication Data

US 2026/0078852 A1 Mar. 19, 2026

(30) Foreign Application Priority Data

Sep. 13, 2024 (CN) .......................... 202411283402.7
Dec. 24, 2024 (CN) .......................... 202411910166.7

(51) Int. Cl.
*F16L 37/373* (2006.01)
*F16L 37/36* (2006.01)

(52) U.S. Cl.
CPC ............. *F16L 37/373* (2013.01); *F16L 37/36* (2013.01)

(58) Field of Classification Search
CPC ................................ F16L 37/36; F16L 37/373
See application file for complete search history.

(56) References Cited

U.S. PATENT DOCUMENTS

| | | | |
|---|---|---|---|
| 4,438,779 A * | 3/1984 | Allread | F16L 37/113 |
| | | | 285/85 |
| 5,505,428 A * | 4/1996 | De Moss | F16L 37/373 |
| | | | 251/368 |
| 8,132,781 B2 | 3/2012 | Haunhorst | |
| 11,879,581 B2 | 1/2024 | Koller et al. | |

FOREIGN PATENT DOCUMENTS

| | | | | |
|---|---|---|---|---|
| CN | 102459985 B | 3/2014 | | |
| CN | 115628302 A | 1/2023 | | |
| CN | 220749088 | 4/2024 | | |
| WO | WO-2024157176 A1 * | 8/2024 | ............ | F16L 37/373 |

* cited by examiner

*Primary Examiner* — Hailey K. Do
(74) *Attorney, Agent, or Firm* — Troutman Pepper Locke LLP; Tim Tingkang Xia, Esq.

(57) ABSTRACT
A fluid connector includes a second pin accommodated in a first pin. Prior to mating of the fluid connector and a complementary connector, a front end of the first pin protrudes forward out of the pin hole, the second pin is located within the pin hole, and a front end of the second pin is accommodated in the accommodating slot. When the fluid connector is mated with the complementary connector, the complementary connector abuts against the first pin, such that the first pin moves backward within the pin hole, and the front end of the second pin moves forward until it is accommodated in the complementary connector. The first pin and the second pin share the same pin hole, and the second pin occupies at least a portion of the inner space of the first pin, thereby facilitating saving the space of the shell.

10 Claims, 18 Drawing Sheets

100

17

13

131
131
131
131

12 123
124
121
125
126
1244
122

16

104
101
103
11

15
151

102

10

A–A

B-B

C-C

D-D

FLUID CONNECTOR

CROSS-REFERENCE TO RELATED PATENT APPLICATION

This non-provisional application claims priority to and the benefit of, pursuant to 35 U.S.C. § 119(a), patent Application Serial No. CN202411283402.7, filed in China on Sep. 13, 2024, and patent application Serial No. CN202411910166.7, filed in China on Dec. 24, 2024. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a fluid connector, and particularly to a fluid connector suited for fluid transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fluid connector, by being coupled to or detached from a complementary connector, may facilitate communicating or blocking the fluid flowing in a fluid channel. An existing fluid connector is disclosed in the Chinese Patent No. CN202321977845.7, which includes an unlocking guiding rod 8 located in a first blind hole 6, and a locking guiding rod 9 located in a second blind hole 7. The unlocking guiding rod 8 is movable between a locking position and an unlocking position. When in the locking position, a front end of the unlocking guiding rod 8 protrudes out of the first blind hole 6, thus allowing a valve stem 4 to maintain in a closed position, and preventing the valve stem 4 from rotating from the closed position to an open position. When in the unlocking position, the front end of the unlocking guiding rod 8 retracts into the first blind hole 6, thus allowing the valve stem 4 to rotate from the closed position to the open position. The locking guiding rod 9 is movable between a first position and a second position. When the locking guiding rod 9 is located at the first position, the front end of the locking guiding rod 9 protrudes out of the second blind hole 7, and when the locking guiding rod 9 is located at the second position, the locking guiding rod 9 retracts into the second blind hole 7.

The aforementioned structure has the following deficiencies:

The unlocking guiding rod is in the first blind hole, and the locking guiding rod is in the second blind hole. Thus, it is required to provide two blind holes on the shell of the fluid connector, and the two blind holes are separated from each other. The two blind holes occupy a large space, which is not conducive to the space usage of the shell.

Therefore, a heretofore unaddressed need to design a new fluid connector exists in the art to address the aforementioned deficiencies and inadequacies.

SUMMARY

In view of the deficiencies of the background technology, the present invention is directed to a fluid connector, in which a first pin is accommodated in a pin hole, a second pin is accommodated in the first pin and the pin hole, and the second pin is movable in the front-rear direction, such that the first pin and the second pin share the same pin hole, and the second pin occupies at least a portion of the inner space of the first pin, thereby facilitating saving the space of the shell.

In view of the deficiencies of the background technology, the present invention is directed to a fluid connector, in which a first pin is accommodated in a pin hole, and a second pin is accommodated in the first pin and the pin hole and is movable in the front-rear direction, such that the first pin and the second pin share the same pin hole, and the second pin occupies at least a portion of the inner space of the first pin, thereby facilitating saving the space of the shell.

To achieve the foregoing objective, the present invention adopts the following technical solutions:

A fluid connector includes: a shell, comprising a mating surface, and a pin hole and a fluid channel respectively extending along an axial direction and running through the mating surface, wherein the mating surface is located at a front end of the shell and is mated with a complementary connector; a valve core, configured to rotate between a closed position blocking the fluid channel and an open position opening the fluid channel; a first pin, accommodated in the pin hole, wherein the first pin moves between a locking position and an unlocking position in a front-rear direction, and the first pin comprises a front end surface and an accommodating slot running through the front end surface; and a second pin, accommodated in the accommodating slot and the pin hole, wherein the second pin is movable in the front-rear direction; wherein prior to mating of the fluid connector and the complementary connector, a front end of the first pin protrudes forward out of the pin hole, the first pin maintains in the locking position, the valve core is in the closed position, the first pin stops the valve core from rotating from the closed position to the open position, and when the valve core is in the closed position, the second pin is in the pin hole and a front end of the second pin is accommodated in the accommodating slot; wherein when the fluid connector is mated with the complementary connector, the complementary connector abuts against the first pin, such that the first pin moves backward within the pin hole until the first pin maintains in the unlocking position, when the first pin is in the unlocking position, the first pin is configured to allow the valve core to rotate from the closed position to the open position, and in a rotating process of the valve core from the closed position to the open position, the front end of the second pin moves forward to protrude out of the accommodating slot and the pin hole, and the front end of the second pin is accommodated in the complementary connector.

In certain embodiments, the fluid connector includes a driving member, the driving member and the valve core are fixed to each other, and the driving member rotates to drive the valve core to rotate; the driving member comprises a gear plate; the first pin comprises a surrounding wall and a reserved slot running through the surrounding wall, the accommodating slot is surrounded by the surrounding wall, and the reserved slot is in communication with the accommodating slot; a rear end of the second pin comprises a pawl along the axial direction, the gear plate passes through the reserved slot and enters the accommodating slot, and the gear plate and the pawl mesh with each other; and the driving member rotates to drive the second pin to move in the front-rear direction.

In certain embodiments, the surrounding wall comprises a blocking surface connected forward to the reserved slot, and when the first pin is in the locking position, the gear plate abuts backward against the blocking surface to stop the first pin from moving forward.

In certain embodiments, the fluid connector includes a driving member, the driving member and the valve core are fixed to each other, and the driving member rotates to drive the valve core to rotate; the driving member comprises a protruding block protruding outward; the first pin comprises a surrounding wall and a reserved slot running through the surrounding wall, the accommodating slot is surrounded by the surrounding wall, the reserved slot is in communication with the accommodating slot, and the surrounding wall comprises a stopping portion connected forward to the reserved slot; when the first pin is in the locking position, the stopping portion stops the protruding block to stop the driving member from rotating; and when the first pin is in the unlocking position, the stopping portion retreats backward, and the reserved slot provides a reserved space for the protruding block to allow the driving member to rotate.

In certain embodiments, the fluid connector includes a driving member, the driving member and the valve core are fixed to each other, and the driving member rotates to drive the valve core to rotate; the driving member comprises a notch concavely provided inward; the first pin comprises a surrounding wall and a stopping portion protruding outward from the surrounding wall, and the accommodating slot is surrounded by the surrounding wall; when the first pin is in the locking position, the stopping portion is engaged in the notch to stop the driving member from rotating; and when the first pin is in the unlocking position, the stopping portion retreats backward to be away from the notch to allow the driving member to rotate.

In certain embodiments, the pin hole comprises a stopping surface located in front of the stopping portion, and when the first pin is in the locking position, the stopping surface abuts backward against the stopping portion to stop the first pin from moving forward.

In certain embodiments, the first pin comprises a surrounding wall, and the accommodating slot is surrounded by the surrounding wall; the surrounding wall comprises a first wall portion and a second wall portion connected forward to the first wall portion, the second wall portion protrudes outward relative to a periphery of the first wall portion to form a blocking surface; and the blocking surface is connected to the first wall portion; the pin hole comprises a protrusion located in front of the blocking surface; and when the first pin is in the locking position, the first wall portion protrudes forward out of the pin hole, and the protrusion abuts backward against the blocking surface to stop the first pin from moving forward.

In certain embodiments, the pin hole comprises an opening running backward therethrough, the first pin is assembled forward into the pin hole from the opening, a rear cover is located at the opening, an elastic member is accommodated in the pin hole, one end of the elastic member abuts against the rear cover, and the other end of the elastic member abuts against the first pin.

In certain embodiments, the first pin comprises a rear end surface, the accommodating slot runs backward through the rear end surface, and prior to mating of the fluid connector and the complementary connector, a rear end of the second pin is located in the accommodating slot.

In certain embodiments, along the front-rear direction, a dimension of the second pin is smaller than a dimension of the first pin.

Compared to the related art, the present invention has the following beneficial effects:

In the present invention, the first pin is provided to be accommodated in the pin hole, and the first pin moves between the locking position and the unlocking position. The first pin includes the front end surface and the accommodating slot running through the front end surface. The second pin is accommodated in the accommodating slot and the pin hole, and the second pin is movable in the front-rear direction, such that the first pin and the second pin share the same pin hole, and the second pin occupies at least a portion of the inner space of the first pin, thereby facilitating saving the space of the shell.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
FIG. 1 is an exploded view of a fluid connector according to a first embodiment of the present invention.
Figure 2:
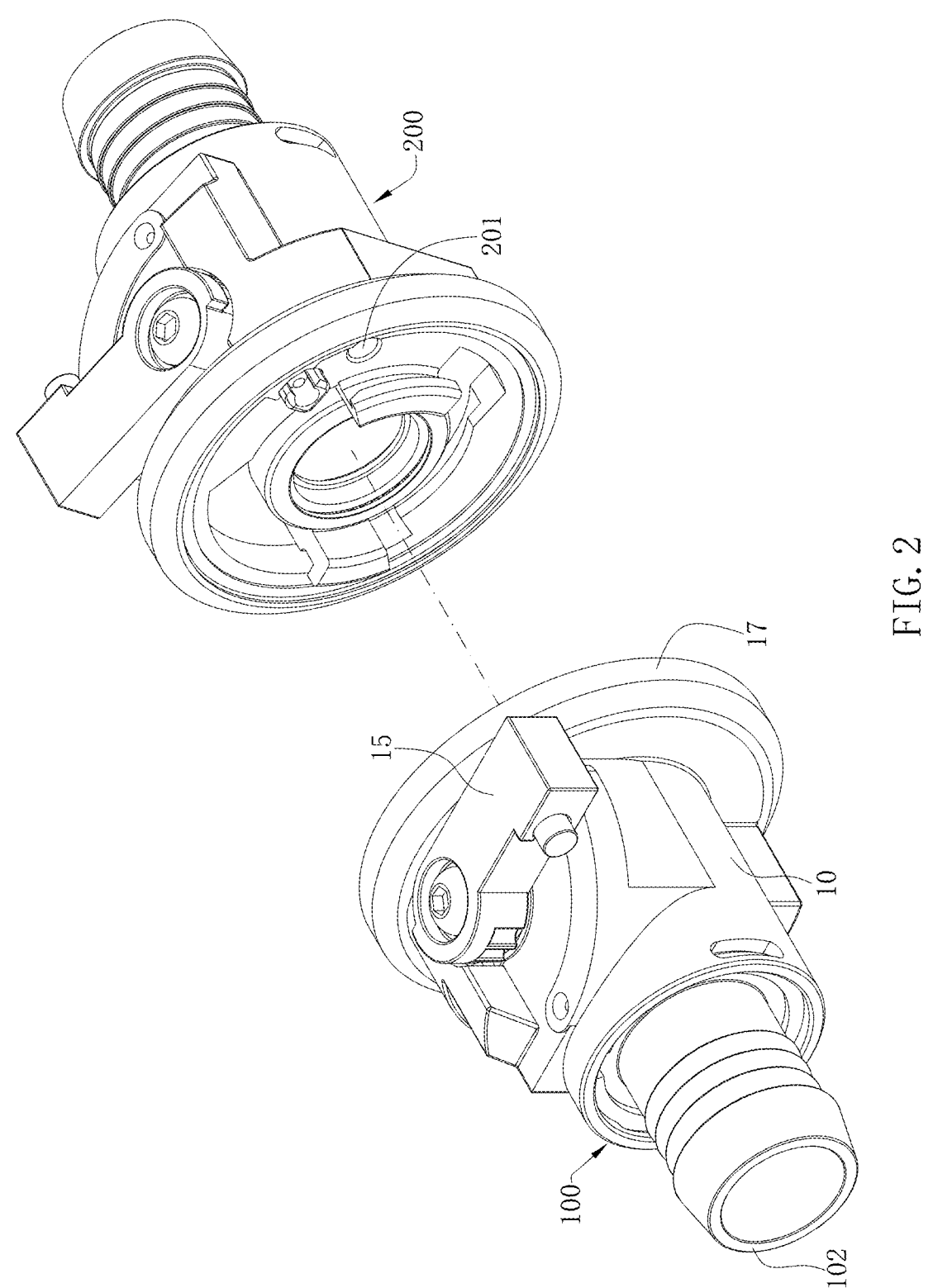
FIG. 2 is a perspective view of the fluid connector prior to mating with a complementary connector according to the first embodiment of the present invention.
Figure 3:
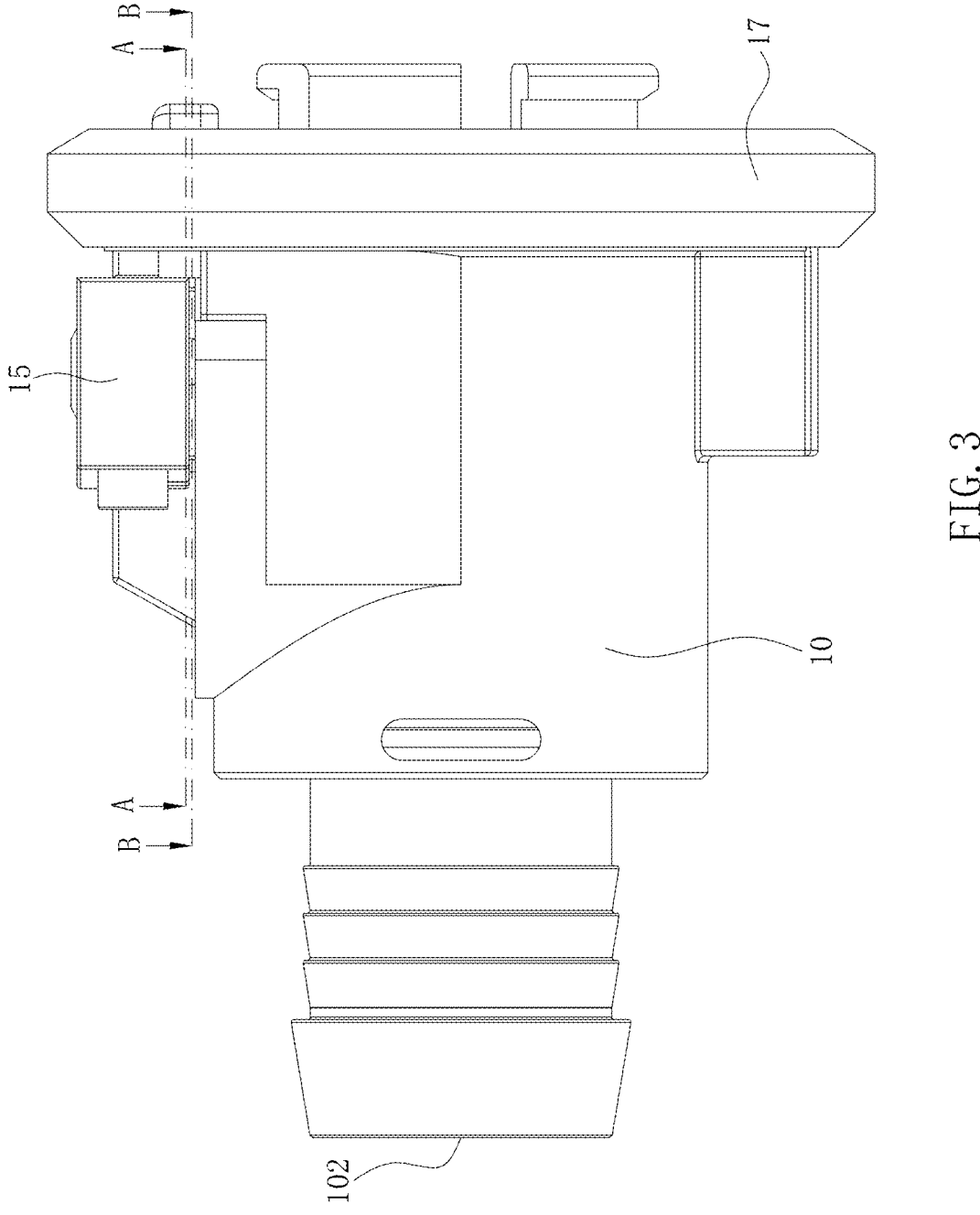
FIG. 3 is a main view of the fluid connector after assembling according to the first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-18. In accordance with the purposes of this invention, as embodied and broadly described herein, this invention, in one aspect, relates to a fluid connector.

FIG. 1 to FIG. 9 show a fluid connector 100 according to a first embodiment of the present invention, which is mated with a complementary connector 200 along a front-rear direction. The fluid connector 100 includes a shell 10, a valve core 11, a first pin 12, a second pin 13, a driving member 15, an elastic member 16, an elastic ring 17 and a seal ring (not numbered). The complementary connector 200 includes a positioning hole 201.

As shown in FIG. 1, the shell 10 includes a mating surface 101 and a fluid channel 103 running through the mating surface 101. The mating surface 101 is located at a front end of the shell 10, and the mating surface 101 is mated with the complementary connector 200 along the front-rear direction. The shell 10 further includes a pin hole 104 extending along the front-rear direction and running through the mating surface 101. The elastic ring 17 is sleeved on the mating surface 101.

The valve core 11 is rotatably mounted in the fluid channel 103. The valve core 11 includes a sphere-shaped outer surface 111 and a through hole 112 running through the sphere-shaped outer surface 111. The valve core 11 may rotate between a closed position blocking the fluid channel 103 and an open position opening the fluid channel 103 around an axis X. The axis X is perpendicular to the front-rear direction and intersects with the front-rear direction. When the valve core 11 is in the closed position, the sphere-shaped outer surface 111 of the valve core 11 matches with the shell 10 and the seal ring (not numbered) to completely block the fluid channel 103, thereby stopping the fluid from passing through the fluid channel 103 from the mating surface 101 of the shell 10. When the valve core 11 is in the open position, the through hole 112 and the fluid channel 103 are coaxially aligned, thus allowing the fluid to pass through the fluid channel 103 from the mating surface 101 of the shell 10.

As shown in FIG. 1, the driving member 15 and the valve core 11 are fixed to each other, and the driving member 15 rotates to drive the valve core 11 to rotate. Once the driving member 15 stops rotating, the valve core 11 also stops rotating.

Figure 4:
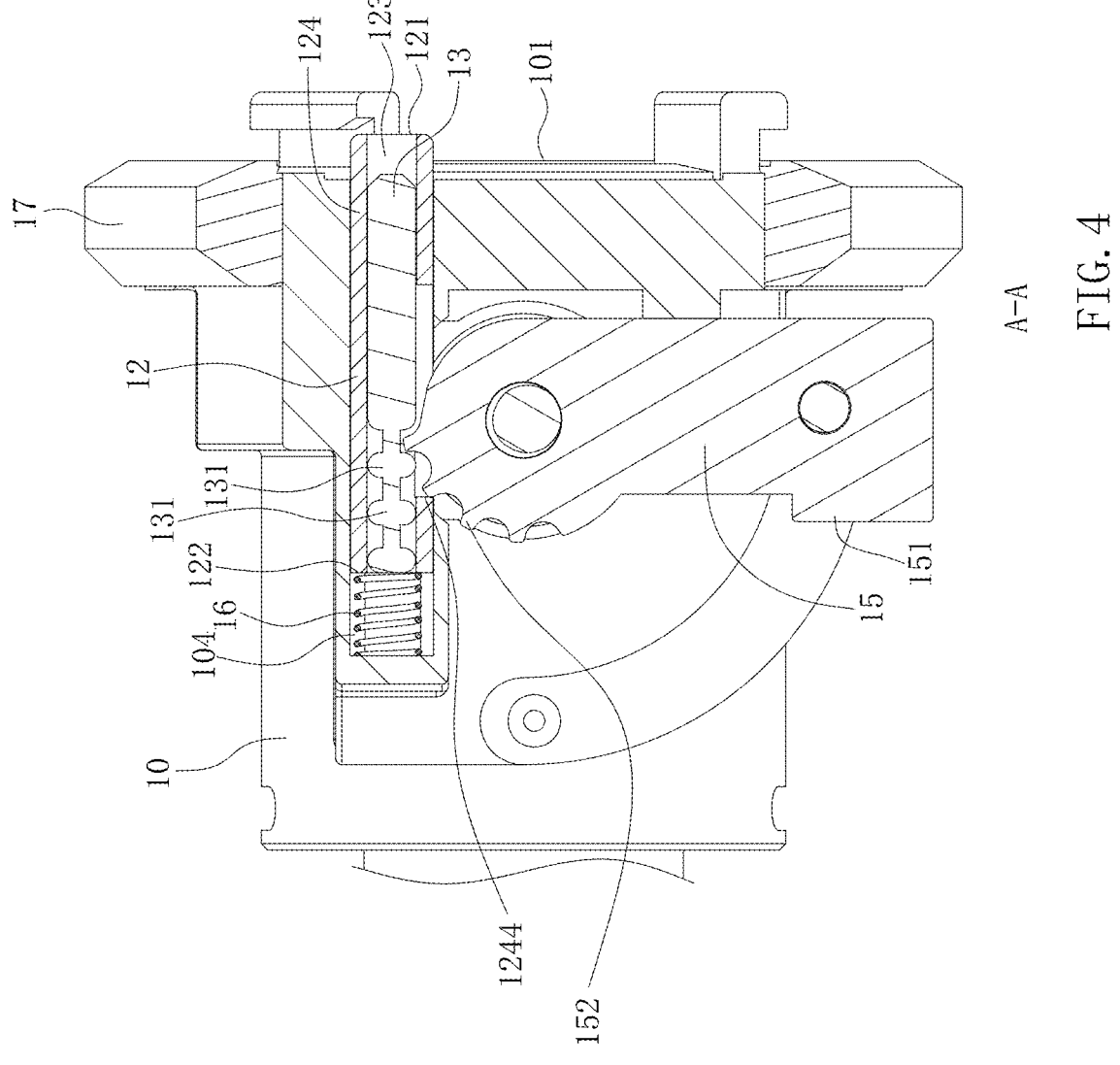
FIG. 4 is a sectional view of FIG. 3 along a line A-A.

As shown in FIG. 4, the first pin 12 is assembled backward into the pin hole 104 from the mating surface 101. The first pin 12 is accommodated in the pin hole 104, and the first pin 12 moves between a locking position and an unlocking position in the front-rear direction. The first pin 12 includes a front end surface 121, a rear end surface 122, and an accommodating slot 123 running through the front end surface 121 and the rear end surface 122. The first pin 12 further includes a surrounding wall 124 and a reserved slot 125 running through the surrounding wall 124. The accommodating slot 123 is surrounded by the surrounding wall 124, and the reserved slot 125 is in communication with the accommodating slot 123. The surrounding wall 124 includes a blocking surface 1244 connected forward to the reserved slot 125.

Figure 5:
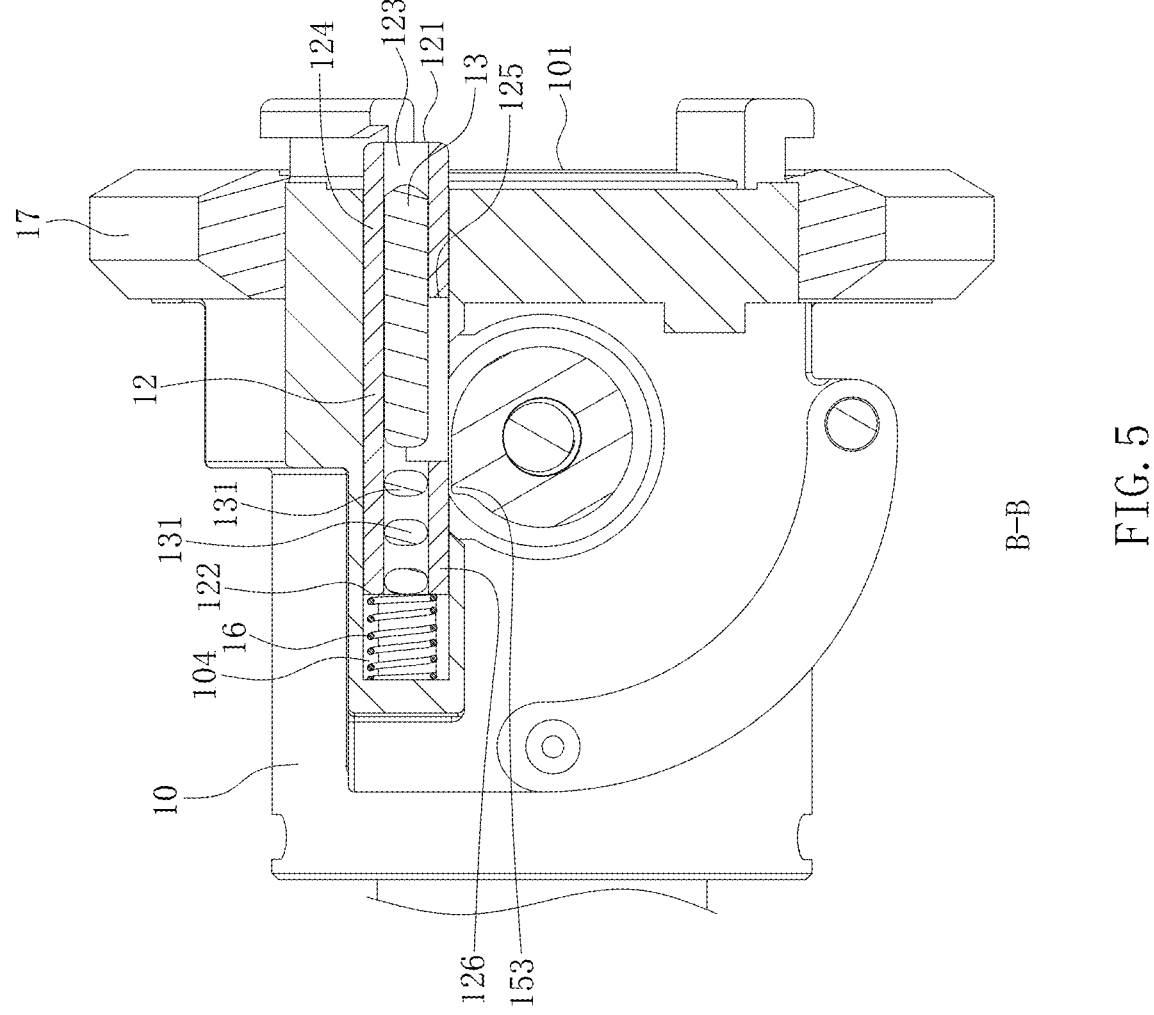
FIG. 5 is a sectional view of FIG. 3 along a line B-B.

As shown in FIG. 5, in the present embodiment, the surrounding wall 124 includes a stopping portion 126 connected forward to the reserved slot 125, and the driving member 15 includes a protruding block 153 protruding outward. When the first pin 12 is in the locking position, the stopping portion 126 stops the protruding block 153 to stop the driving member 15 from rotating. When the first pin 12 is in the unlocking position, the stopping portion 126 retreats backward, and the reserved slot 125 provides a reserved space for the protruding block 153 to allow the driving member 15 to rotate.

As shown in FIG. 4, along the front-rear direction, a dimension of the second pin 13 is smaller than a dimension of the first pin 12, and the second pin 13 is accommodated in the accommodating slot 123 and the pin hole 104. The second pin 13 is movable within the pin hole 104 along the front-rear direction. A rear end of the second pin 13 includes a pawl 131 along the front-rear direction. The driving member 15 includes a gear plate 152, and the gear plate 152 is adjacent to the protruding block 153 in the direction of the axis X. The gear plate 152 passes through the reserved slot 125 and enters the accommodating slot 123, and the gear plate 152 and the pawl 131 mesh with each other, allowing the driving member 15 to rotate around the axis X to drive the second pin 13 to move within the pin hole 104 in the front-rear direction. Similarly, the driving member 15 stops rotating, which causes the second pin 13 to stop moving within the pin hole 104.

As shown in FIG. 4 and FIG. 5, the elastic member 16 is accommodated in the pin hole 104. One end of the elastic member 16 abuts against a rear wall of the pin hole 104, and the other end of the elastic member 16 abuts against the rear end surface 122 of the first pin 12. When the first pin 12 is in the locking position, the rear end surface 122 of the first pin 12 is located behind the location of the gear plate 152 and the pawl 131 meshing with each other. When the first pin 12 is in the closed position, the rear end of the second pin 13 does not pass backward beyond the rear end surface 122.

The mating and the detaching processes of the fluid connector 100 and the complementary connector 200 are as follows:

As shown in FIG. 4 and FIG. 5, prior to the mating of the fluid connector 100 and the complementary connector 200, a front end of the first pin 12 protrudes forward out of the pin hole 104, and the first pin 12 maintains in the locking position. At this time, the gear plate 152 abuts backward against the blocking surface 1244 to stop the first pin 12 from moving forward, and the stopping portion 126 stops the protruding block 153 to stop the driving member 15 from rotating. The driving member 15 stops rotating, which causes the second pin 13 to stop moving in the pin hole 104. That is, the valve core 11 is in the closed position, and the first pin 12 stops the valve core 11 from rotating from the closed position to the open position. When the valve core 11 is in the closed position, the second pin 13 is in the pin hole 104, a front end of the second pin 13 is accommodated in the accommodating slot 123, and a rear end of the second pin 13 is located in the accommodating slot 123.

Figure 6:
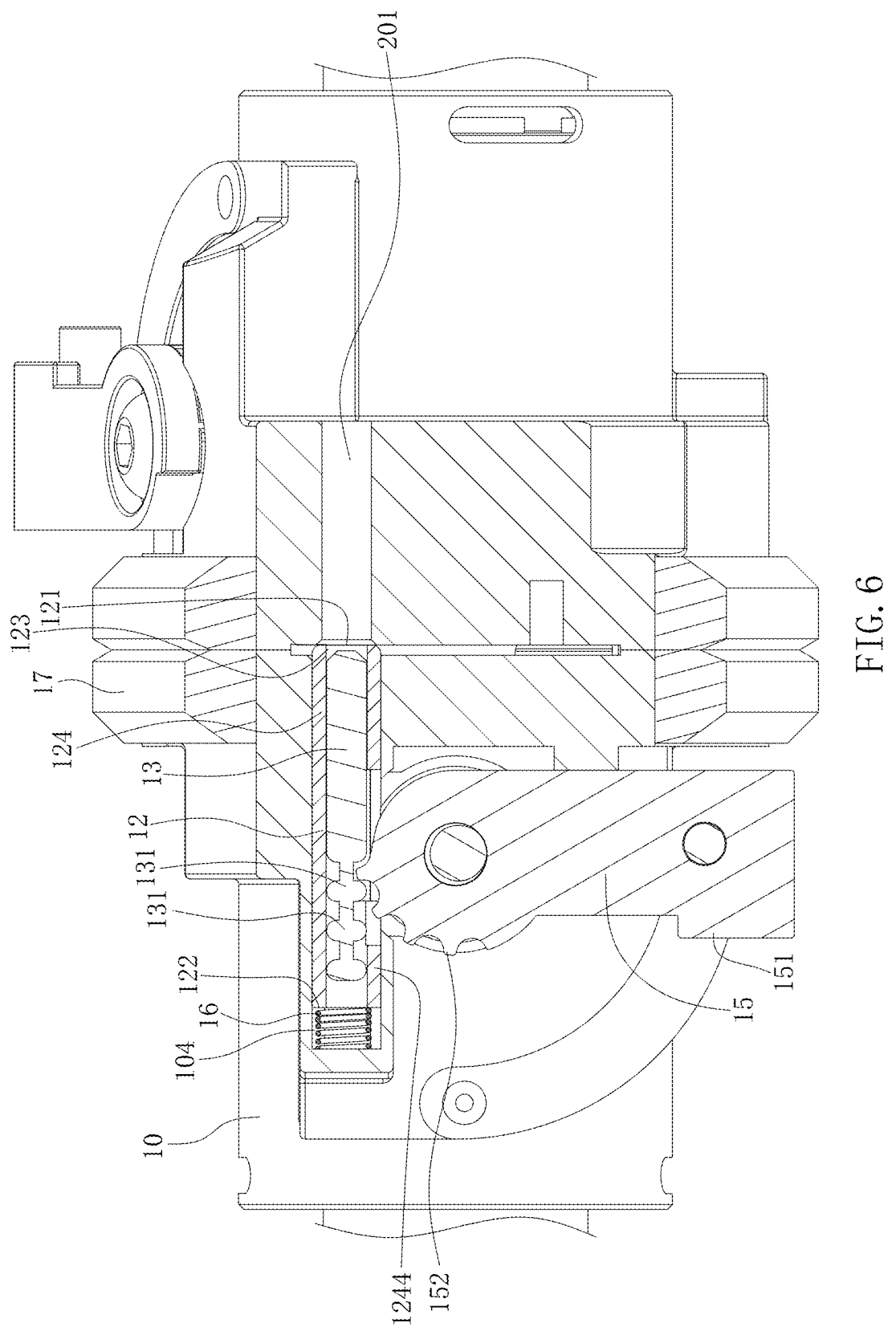
FIG. 6 is a sectional view of the fluid connector after mating with the complementary connector and prior to rotating the driving member in FIG. 4.
Figure 7:
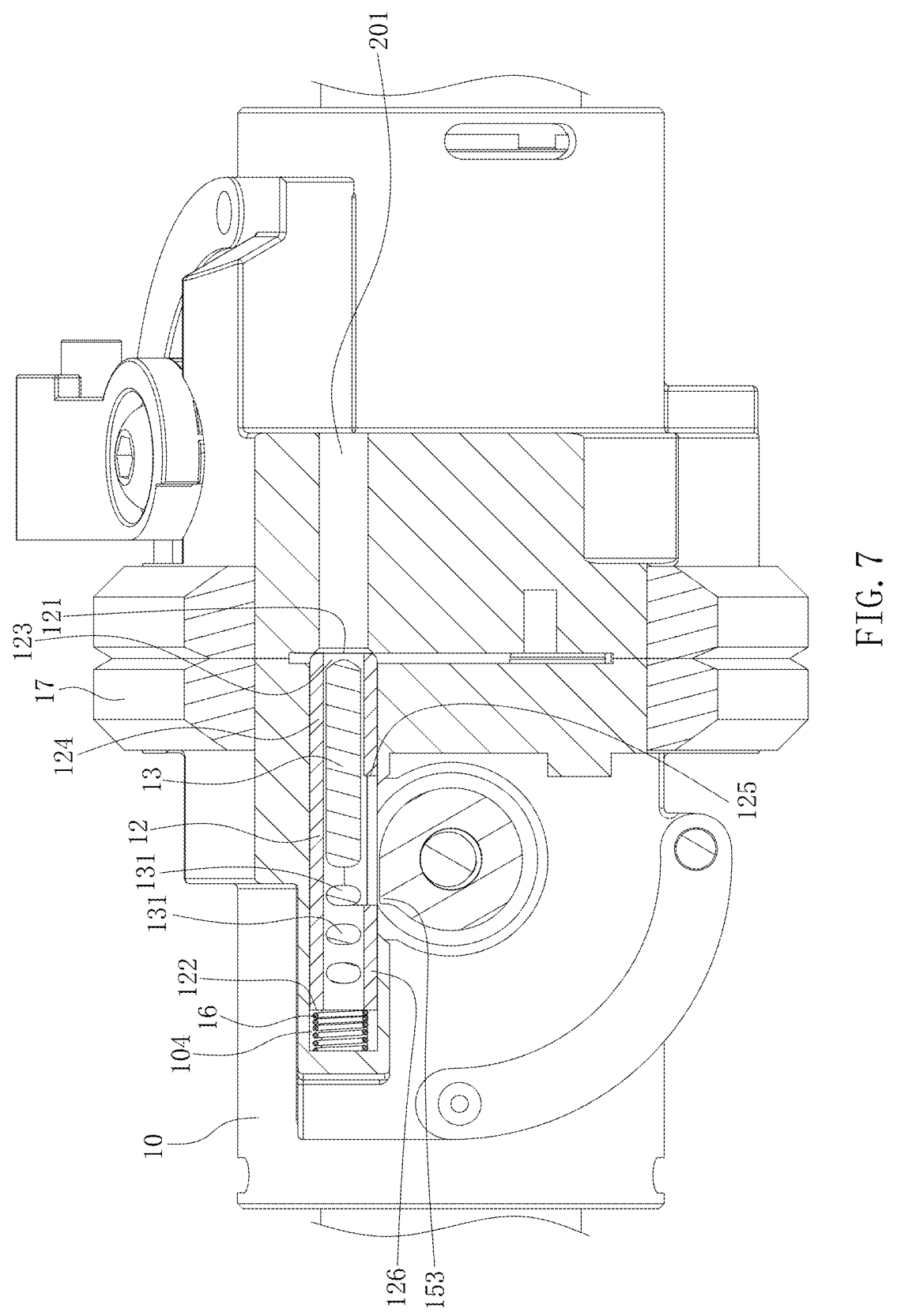
FIG. 7 is a sectional view of the fluid connector after mating with the complementary connector and prior to rotating the driving member in FIG. 5.
Figure 8:
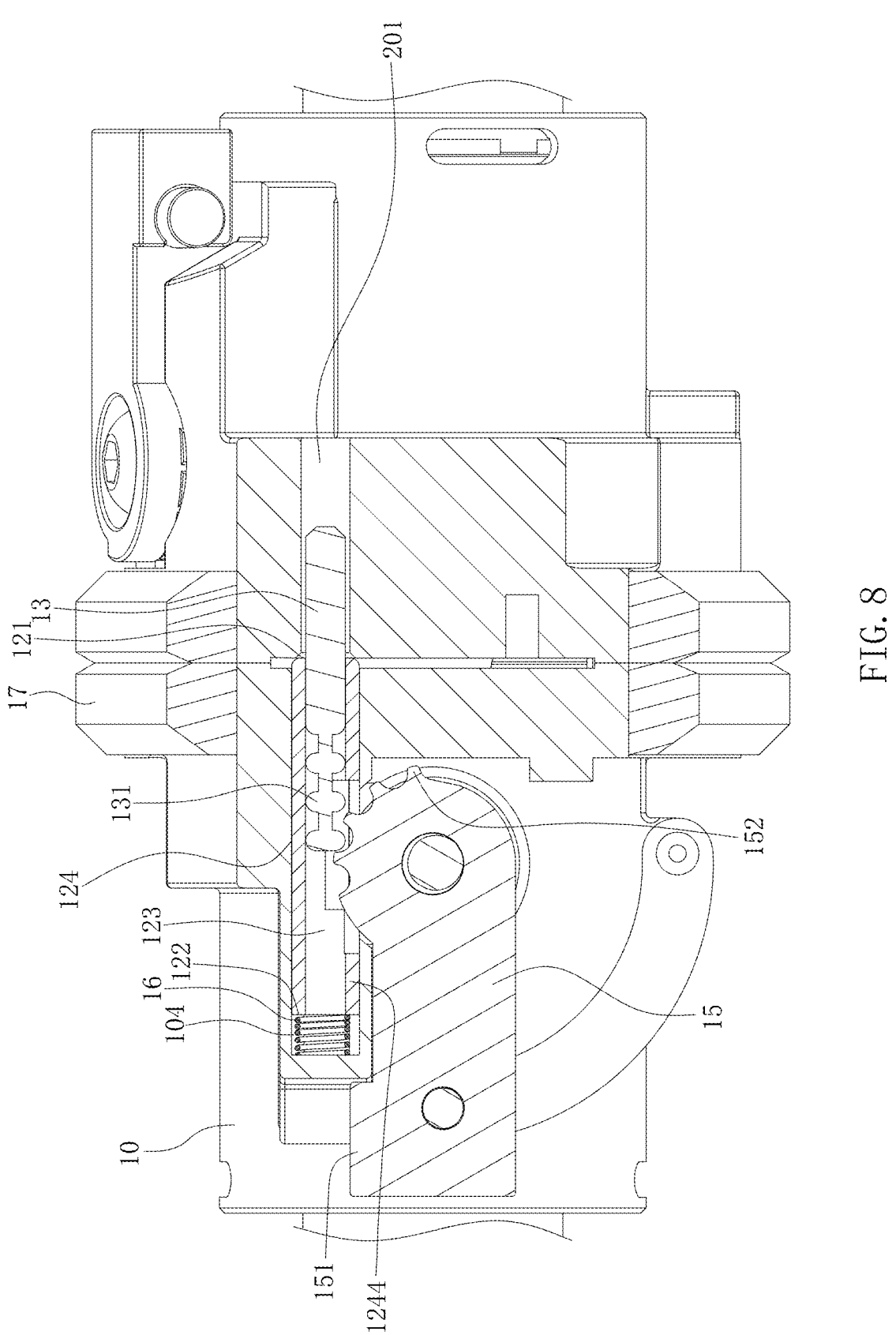
FIG. 8 is a sectional view of the fluid connector after mating with the complementary connector and after rotating the driving member in FIG. 4.
Figure 9:
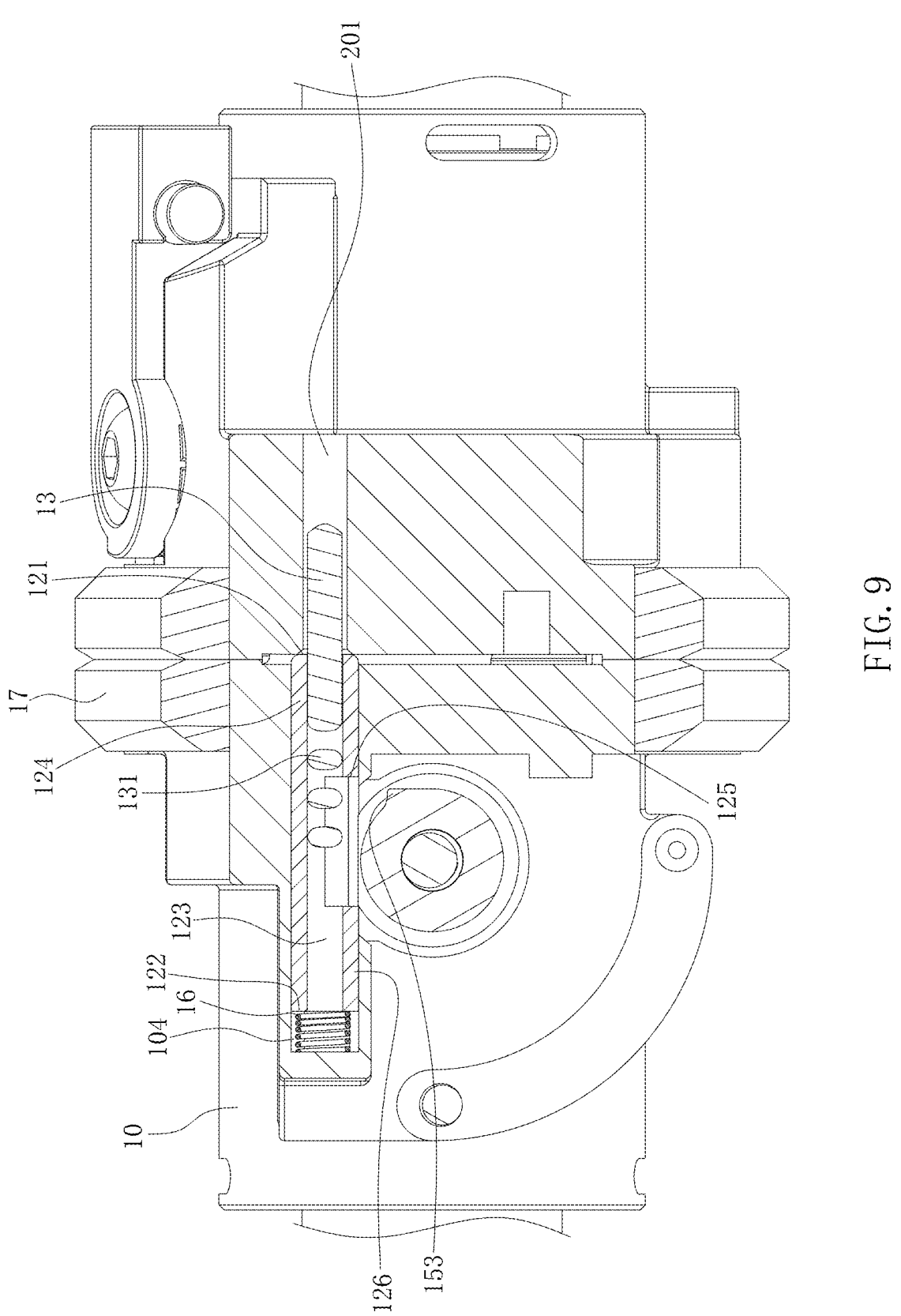
FIG. 9 is a sectional view of the fluid connector after mating with the complementary connector and after rotating the driving member in FIG. 5.

As shown in FIG. 6 and FIG. 7, when the fluid connector 100 is mated with the complementary connector 200, the complementary connector 200 abuts against the first pin 12, such that the first pin 12 moves backward within the pin hole 104 until the first pin 12 maintains in the unlocking position. As shown in FIG. 8 and FIG. 9, then, the complementary connector 200 rotates relative to the fluid connector 100, and the second pin 13 is aligned with the positioning hole 201 of the complementary connector 200. When the first pin 12 is in the unlocking position, the stopping portion 126 has retreated to a location where it cannot stop the protruding block 153, and the reserved slot 125 provides a reserved space for the protruding block 153 to allow the driving member 15 to rotate. That is, the first pin 12 is used to allow the valve core 11 to rotate from the closed position to the open position, and in the rotating process of the valve core 11 from the closed position to the open position, the front end of the second pin 13 moves forward to protrude out of the accommodating slot 123 and the pin hole 104, and the front end of the second pin 13 is accommodated in the positioning hole 201 of the complementary connector 200.

Prior to the detaching of the fluid connector 100 and the complementary connector 200, the driving member 15 drives the valve core 11 to rotate from the open position to the closed position, and the front end of the second pin 13 moves backward to retract into the accommodating slot 123 and the pin hole 104.

When the fluid connector 100 and the complementary connector 200 detach, the complementary connector 200 is released from abutting against the first pin 12, such that the first pin 12 moves forward within the pin hole 104 by the abutting of the elastic member 16. In the moving process of the first pin 12 from the unlocking position to the locking position, the stopping portion 126 moves forward. When the first pin 12 is maintained in the locking position, the gear plate 152 abuts backward against the blocking surface 1244 to stop the first pin 12 from moving forward, and the stopping portion 126 stops the protruding block 153 to stop the driving member 15 from rotating. That is, the valve core 11 is in the closed position, and the first pin 12 stops the valve core 11 from rotating from the closed position to the open position.

Figure 10:
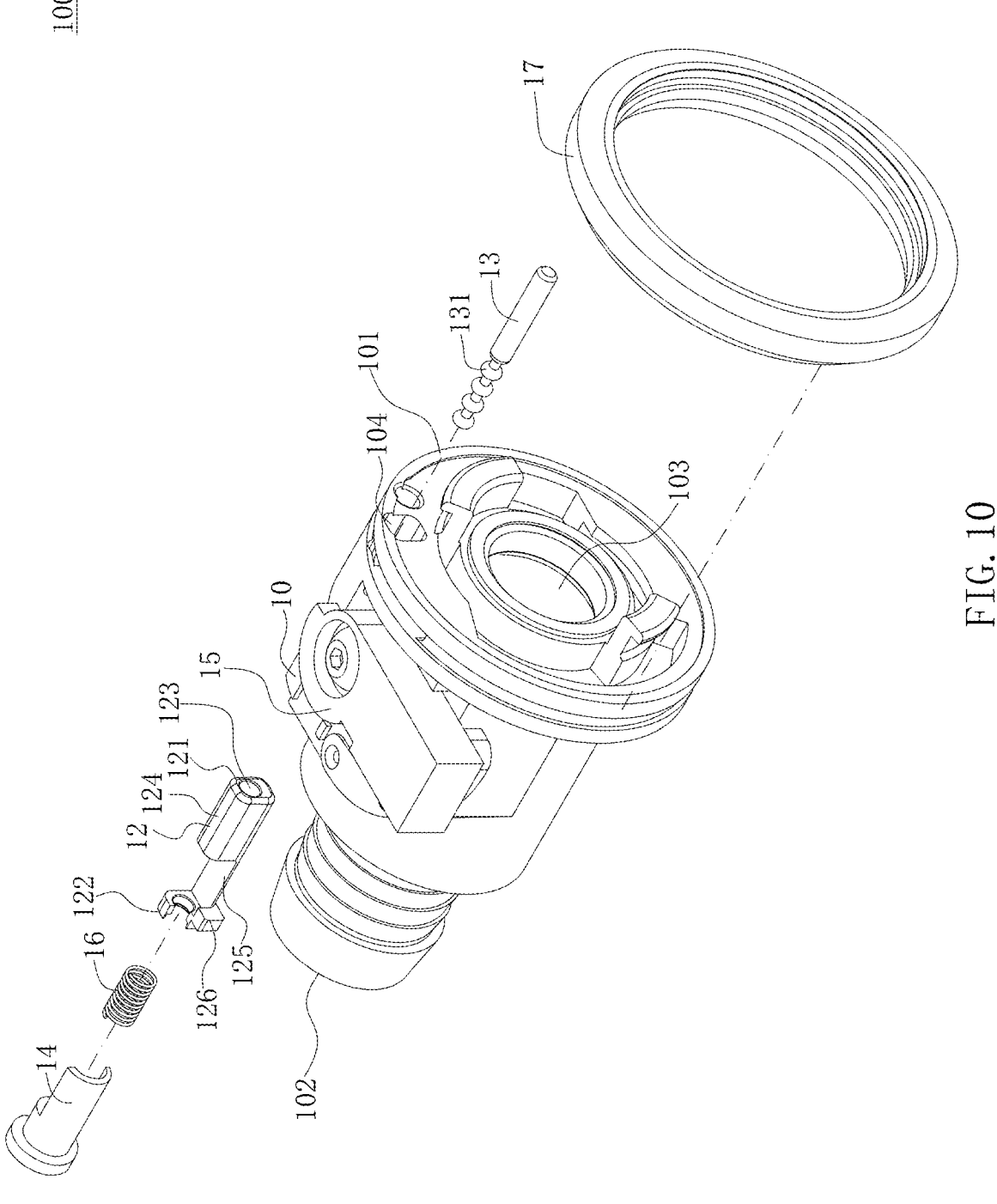
FIG. 10 is an exploded view of a fluid connector according to a second embodiment of the present invention.
Figure 11:
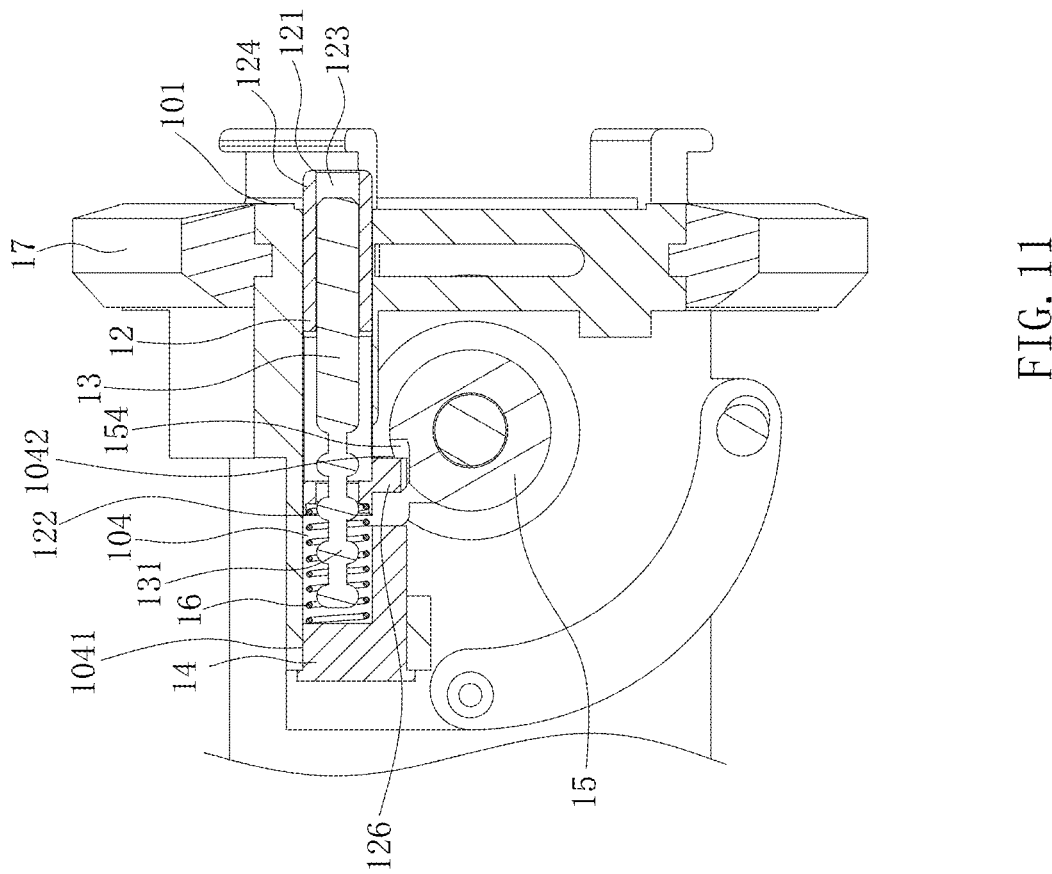
FIG. 11 is a sectional view of the fluid connector according to the second embodiment of the present invention.
Figure 12:
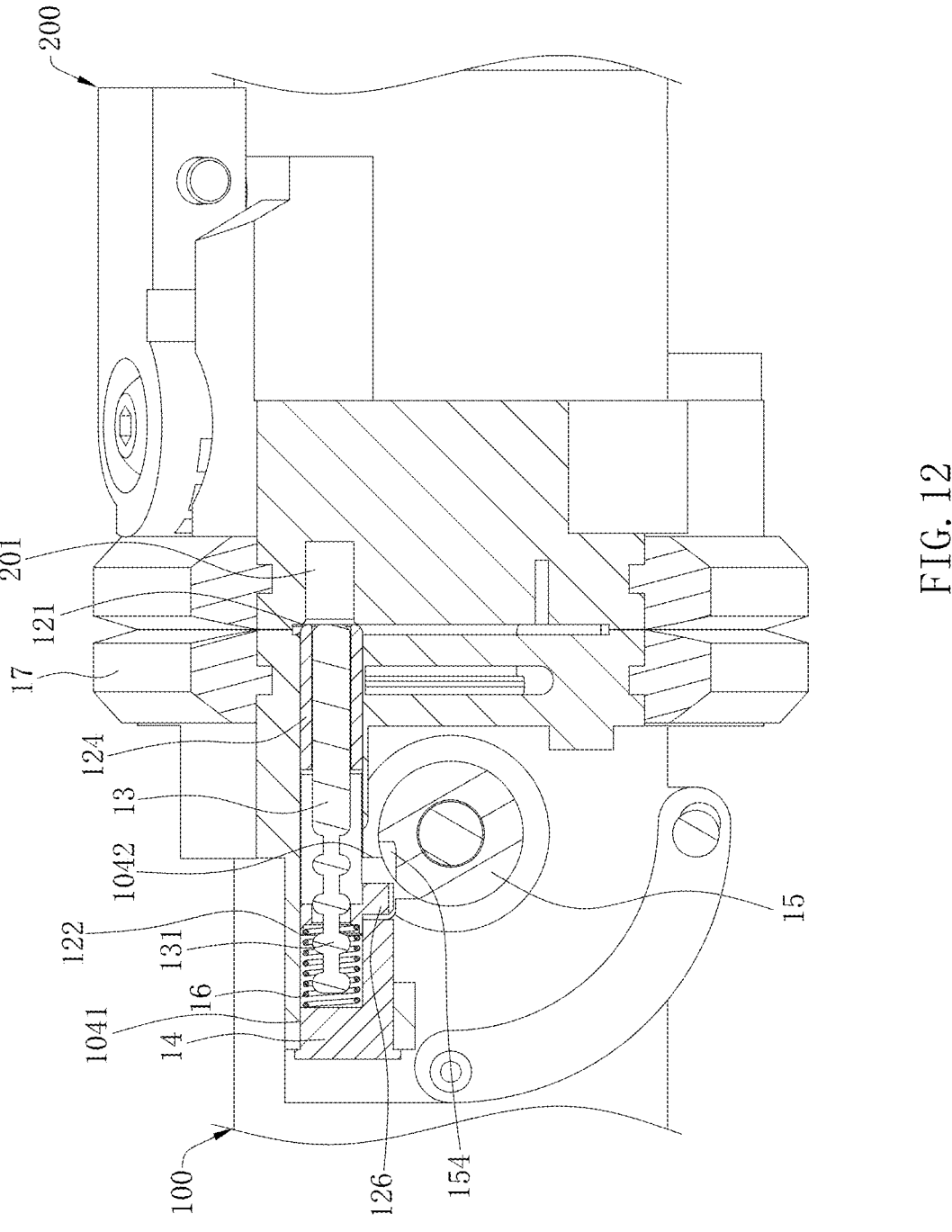
FIG. 12 is a sectional view of the fluid connector after mating with the complementary connector in FIG. 11.

FIG. 10 to FIG. 12 show a fluid connector 100 according to a second embodiment of the present invention, which is mated with a complementary connector 200 along a front-rear direction. The fluid connector 100 includes a shell 10, a valve core 11, a first pin 12, a second pin 13, a rear cover 14, a driving member 15, an elastic member 16, an elastic ring 17 and a seal ring (not numbered). The complementary connector 200 includes a positioning hole 201.

As shown in FIG. 10, the shell 10 includes a mating surface 101 and a fluid channel 103 running through the mating surface 101. The mating surface 101 is located at a front end of the shell 10, and the mating surface 101 is mated with the complementary connector 200 along the front-rear direction. The shell 10 further includes a pin hole 104 extending along the front-rear direction and running through the mating surface 101. The pin hole 104 includes an opening 1041 running backward therethrough. The elastic ring is sleeved on the mating surface 101.

The valve core 11 is rotatably mounted in the fluid channel 103. The valve core 11 includes a sphere-shaped outer surface 111 and a through hole 112 running through the sphere-shaped outer surface 111. The valve core 11 may rotate between a closed position blocking the fluid channel 103 and an open position opening the fluid channel 103 around an axis X. The axis X is perpendicular to the front-rear direction and intersects with the front-rear direction. When the valve core 11 is in the closed position, the sphere-shaped outer surface 111 of the valve core 11 matches with the shell 10 and the seal ring (not numbered) to completely block the fluid channel 103, thereby stopping the fluid from passing through the fluid channel 103 from the mating surface 101 of the shell 10. When the valve core 11 is in the open position, the through hole 112 and the fluid channel 103 are coaxially aligned, thus allowing the fluid to pass through the fluid channel 103 from the mating surface 101 of the shell 10.

As shown in FIG. 10, the driving member 15 and the valve core 11 are fixed to each other, and the driving member 15 rotates to drive the valve core 11 to rotate. Once the driving member 15 stops rotating, the valve core 11 also stops rotating. The driving member 15 includes a notch 154 concavely provided inward.

As shown in FIG. 11 to FIG. 12, the first pin 12 is assembled forward into the pin hole 104 from the opening 1041. The first pin 12 is accommodated in the pin hole 104, and the first pin 12 moves between a locking position and an unlocking position in the front-rear direction. The first pin 12 includes a front end surface 121, a rear end surface 122, and an accommodating slot 123 running through the front end surface 121 and the rear end surface 122. The first pin 12 further includes a surrounding wall 124, a reserved slot 125 running through the surrounding wall 124, and a stopping portion 126 protruding outward from the surrounding wall 124. The accommodating slot 123 is surroundingly formed by the surrounding wall 124. The reserved slot 125 is in communication with the accommodating slot 123. The pin hole 104 includes a stopping surface 1042 located in front of the stopping portion 126. When the first pin 12 is in the locking position, the stopping surface 1042 abuts backward against the stopping portion 126 to stop the first pin 12 from moving forward. At this time, the stopping portion 126 is engaged in the notch 154 to stop the driving member 15 from rotating. When the first pin 12 is in the unlocking position, the stopping portion 126 retreats backward to be away from the notch 154 to allow the driving member 15 to rotate.

As shown in FIG. 11, the second pin 13 is accommodated in the accommodating slot 123 and the pin hole 104. The second pin 13 is movable within the pin hole 104 along the front-rear direction. A rear end of the second pin 13 includes a pawl 131 along the front-rear direction. The driving member 15 includes a gear plate 152, and the gear plate 152 is adjacent to the notch 154 in the direction of the axis X. The gear plate 152 passes through the reserved slot 125 and enters the accommodating slot 123, and the gear plate 152 and the pawl 131 mesh with each other, allowing the driving member 15 to rotate around the axis X to drive the second pin 13 to move within the pin hole 104 in the front-rear direction. Similarly, the driving member 15 stops rotating, which causes the second pin 13 to stop moving within the pin hole 104.

As shown in FIG. 11 to FIG. 12, the elastic member 16 is accommodated in the pin hole 104. One end of the elastic member 16 abuts against a rear cover 14, which is located at the opening 1041, and the other end of the elastic member 16 abuts against the first pin 12. When the first pin 12 is in the locking position, the rear end surface 122 of the first pin 12 is located behind the location of the gear plate 152 and the pawl 131 meshing with each other. When the first pin 12 is in the closed position, the rear end of the second pin 13 passes backward beyond the rear end surface 122.

The mating and the detaching processes of the fluid connector 100 and the complementary connector 200 are as follows:

As shown in FIG. 11, prior to the mating of the fluid connector 100 and the complementary connector 200, a front end of the first pin 12 protrudes forward out of the pin hole 104, and the first pin 12 maintains in the locking position. At this time, the stopping surface 1042 abuts backward against the stopping portion 126 to stop the first pin 12 from moving forward, and the stopping portion 126 is engaged in the notch 154 to stop the driving member 15 from rotating. The driving member 15 stops rotating, which causes the second pin 13 to stop moving in the pin hole 104. That is, the valve core 11 is in the closed position, and the first pin 12 stops the valve core 11 from rotating from the closed position to the open position. When the valve core 11 is in the closed position, the second pin 13 is in the pin hole 104, a front end of the second pin 13 is accommodated in the accommodating slot 123, and a rear end of the second pin 13 protrudes backward out of the accommodating slot 123.

As shown in FIG. 12, when the fluid connector 100 is mated with the complementary connector 200, the complementary connector 200 abuts against the first pin 12, such that the first pin 12 moves backward within the pin hole 104 until the first pin 12 maintains in the unlocking position. Then, the complementary connector 200 rotates relative to the fluid connector 100, and the second pin 13 is aligned with the positioning hole 201 of the complementary connector 200. When the first pin 12 is in the unlocking position, the stopping portion 126 has retreated to a location away from the notch 154 to allow the driving member 15 to rotate. That is, the first pin 12 is used to allow the valve core 11 to rotate from the closed position to the open position, and in the rotating process of the valve core 11 from the closed position to the open position, the front end of the second pin 13 moves forward to protrude out of the accommodating slot 123 and the pin hole 104, and the front end of the second pin 13 is accommodated in the positioning hole 201 of the complementary connector 200.

Prior to the detaching of the fluid connector 100 and the complementary connector 200, the driving member 15 drives the valve core 11 to rotate from the open position to the closed position, and the front end of the second pin 13 moves backward to retract into the accommodating slot 123 and the pin hole 104.

When the fluid connector 100 and the complementary connector 200 detach, the complementary connector 200 is released from abutting against the first pin 12, such that the first pin 12 moves forward within the pin hole 104 by the abutting of the elastic member 16. In the moving process of the first pin 12 from the unlocking position to the locking position, the stopping portion 126 moves closer to the stopping surface 1042 of the pin hole 104 until it abuts forward against the stopping surface 1042. When the first pin 12 is maintained in the locking position, the stopping surface 1042 abuts backward against the stopping portion 126 to stop the first pin 12 from moving forward, and the stopping portion 126 is engaged in the notch 154 to stop the driving member 15 from rotating. That is, the valve core 11 is in the closed position, and the first pin 12 stops the valve core 11 from rotating from the closed position to the open position.

FIG. 13 to FIG. 18 show a fluid connector 100 according to a third embodiment of the present invention, which is mated with a complementary connector 200 along a front-rear direction. The fluid connector 100 includes a shell 10, a valve core 11, a first pin 12, a second pin 13, a rear cover 14, a driving member 15, an elastic member 16, an elastic ring 17 and a seal ring (not numbered). The complementary connector 200 includes a positioning hole 201.

Figure 13:
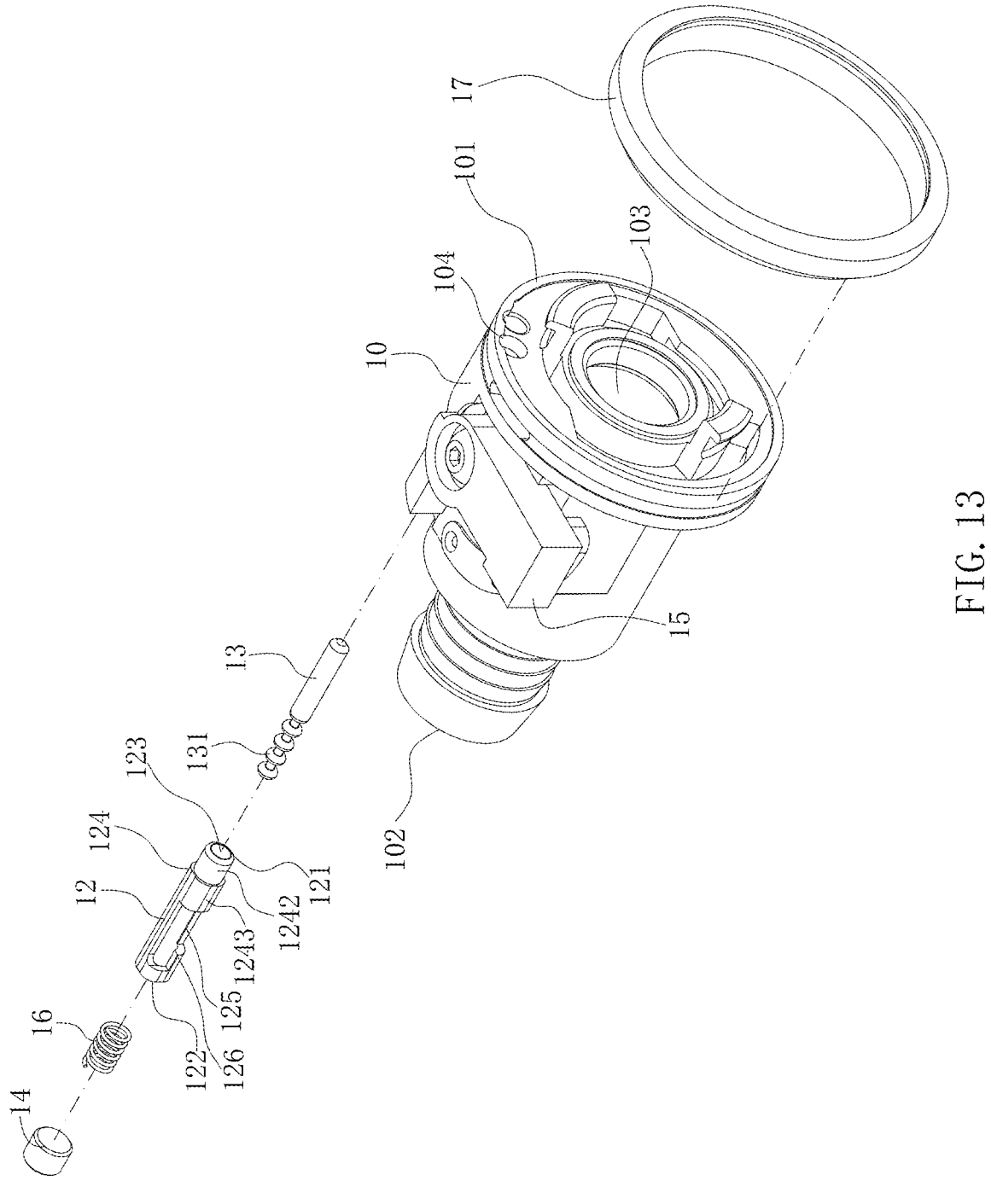
FIG. 13 is an exploded view of a fluid connector according to a third embodiment of the present invention.
Figure 14:
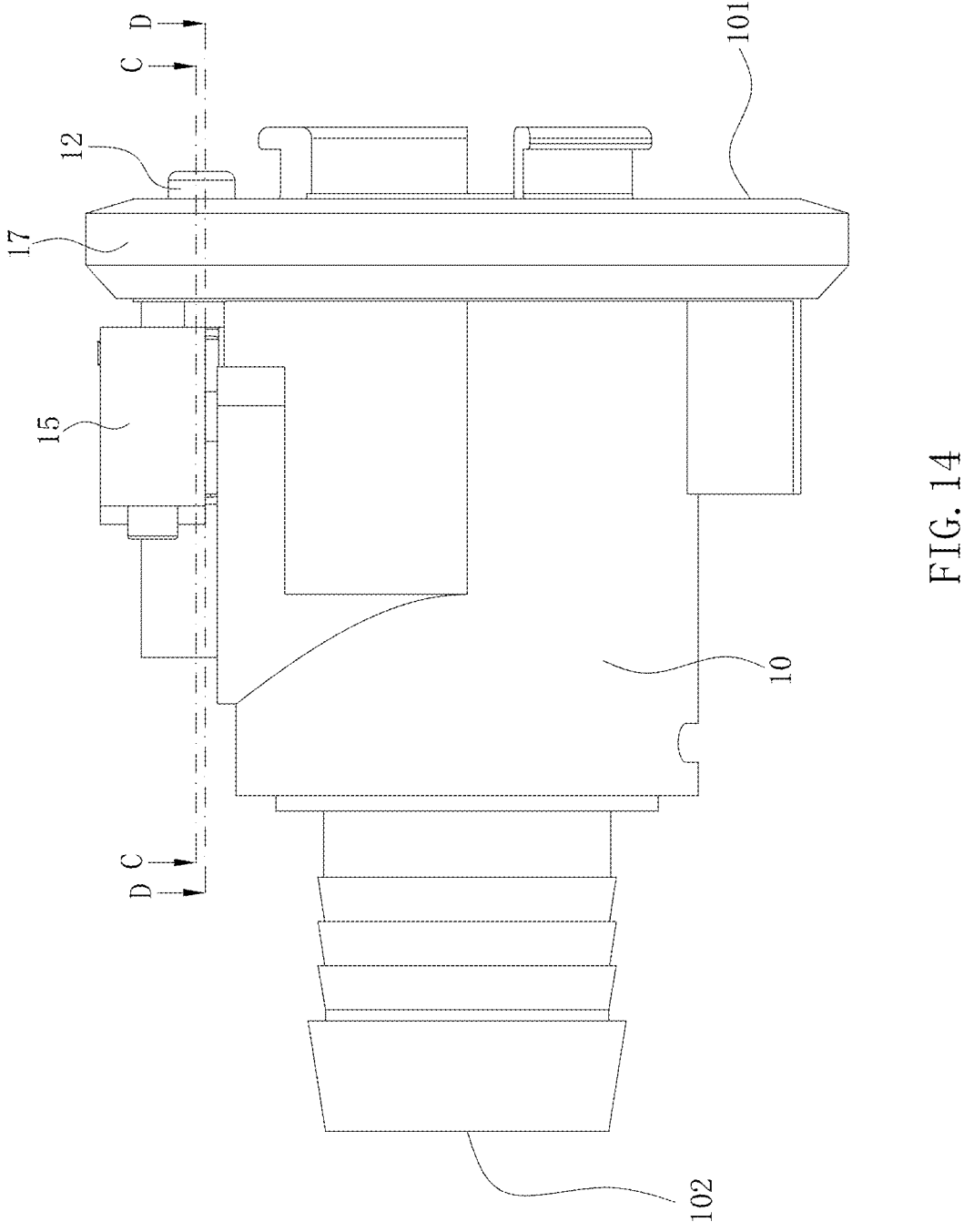
FIG. 14 is a main view of the fluid connector after assembling according to the third embodiment of the present invention.

As shown in FIG. 13, the shell 10 includes a mating surface 101 and a fluid channel 103 running through the mating surface 101. The mating surface 101 is located at a front end of the shell 10, and the mating surface 101 is mated with the complementary connector 200 along the front-rear direction. The shell 10 further includes a pin hole 104 extending along the front-rear direction and running through the mating surface 101. The pin hole 104 includes an opening 1041 running backward therethrough. The elastic ring 17 is sleeved on the mating surface 101.

The valve core 11 is rotatably mounted in the fluid channel 103. The valve core 11 includes a sphere-shaped outer surface 111 and a through hole 112 running through the sphere-shaped outer surface 111. The valve core 11 may rotate between a closed position blocking the fluid channel 103 and an open position opening the fluid channel 103 around an axis X. The axis X is perpendicular to the front-rear direction and intersects with the front-rear direction. When the valve core 11 is in the closed position, the sphere-shaped outer surface 111 of the valve core 11 matches with the shell 10 and the seal ring (not numbered) to completely block the fluid channel 103, thereby stopping the fluid from passing through the fluid channel 103 from the mating surface 101 of the shell 10. When the valve core 11 is in the open position, the through hole 112 and the fluid channel 103 are coaxially aligned, thus allowing the fluid to pass through the fluid channel 103 from the mating surface 101 of the shell 10.

As shown in FIG. 13, the driving member 15 and the valve core 11 are fixed to each other, and the driving member 15 rotates to drive the valve core 11 to rotate. Once the driving member 15 stops rotating, the valve core 11 also stops rotating. The driving member 15 includes a notch 154 concavely provided inward.

Figure 15:
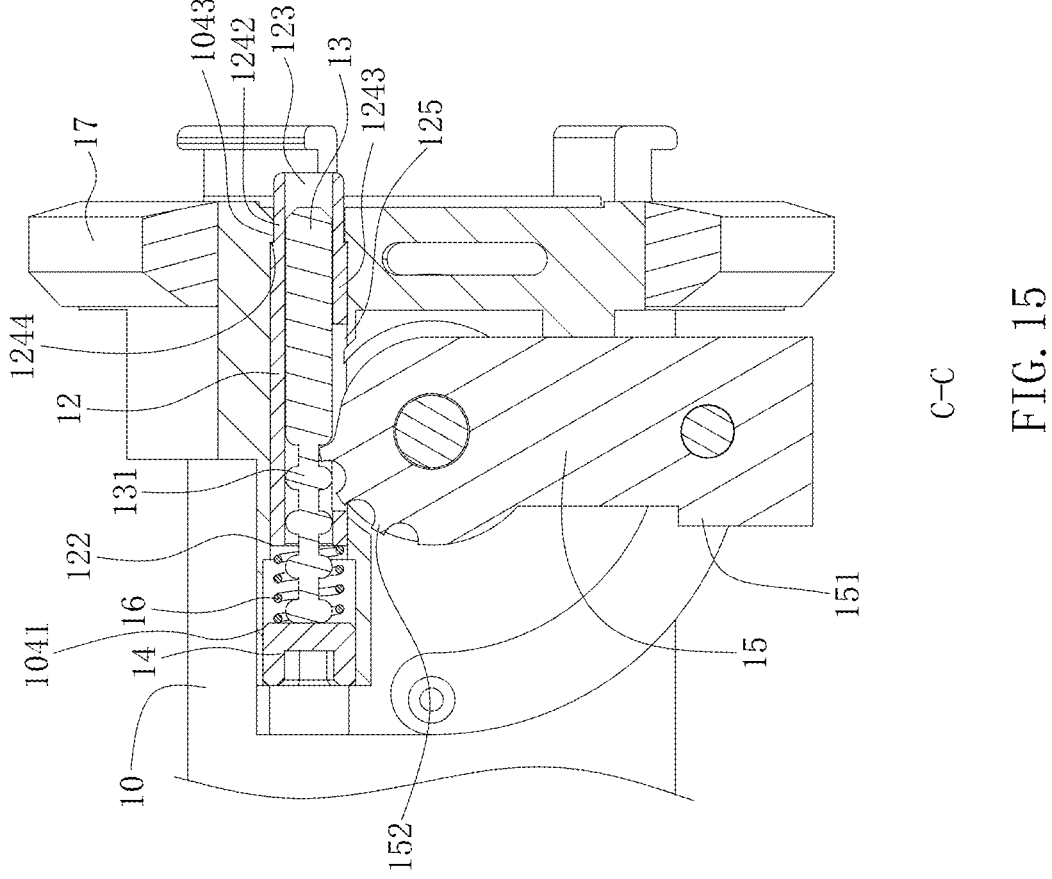
FIG. 15 is a sectional view of FIG. 14 along a line C-C.
Figure 17:
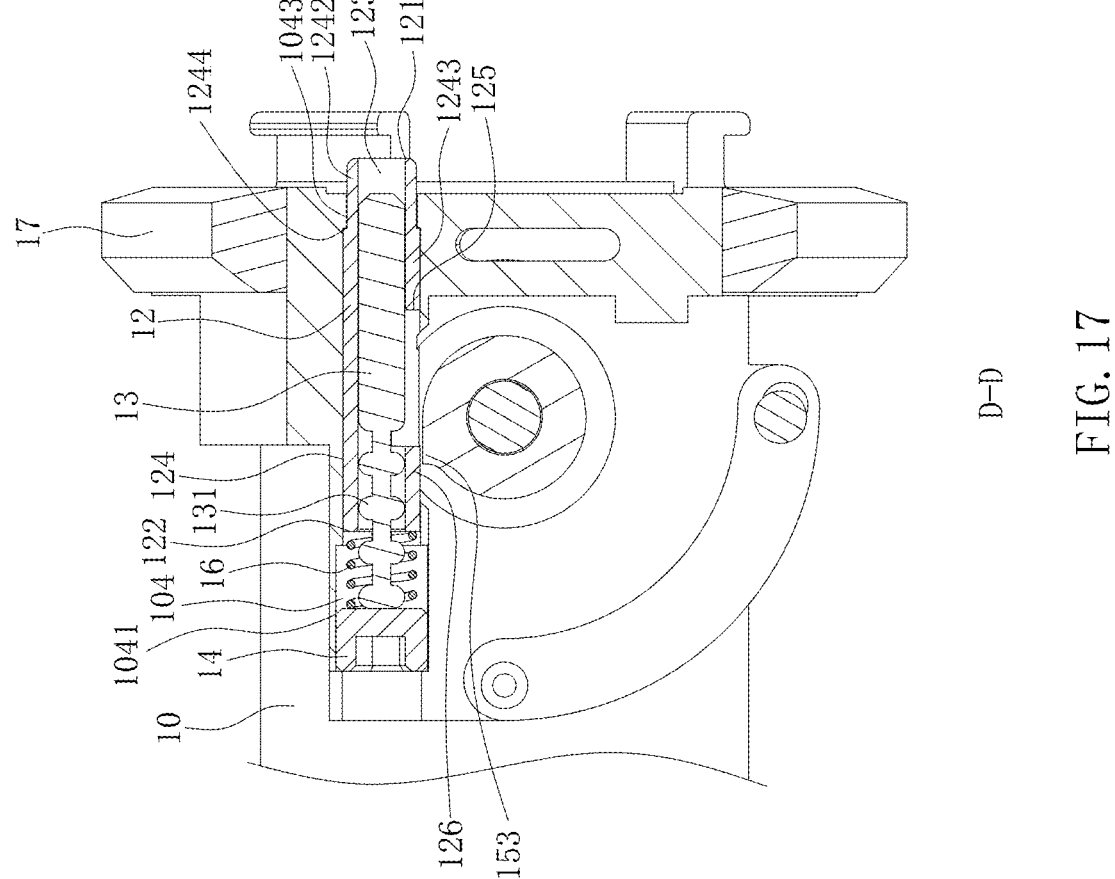
FIG. 17 is a sectional view of FIG. 14 along a line D-D.

As shown in FIG. 15 and FIG. 17, the first pin 12 is assembled forward into the pin hole 104 from the opening 1041. The first pin 12 is accommodated in the pin hole 104, and the first pin 12 moves between a locking position and an unlocking position in the front-rear direction. The first pin 12 includes a front end surface 121, a rear end surface 122, and an accommodating slot 123 running through the front end surface 121 and the rear end surface 122. The first pin 12 further includes a surrounding wall 124 and a reserved slot 125 running through the surrounding wall 124. The accommodating slot 123 is surrounded by the surrounding wall 124, and the reserved slot 125 is in communication with the accommodating slot 123. The surrounding wall 124 includes a first wall portion 1242 and a second wall portion 1243 connected forward to the first wall portion 1242. The first wall portion 1242 is concavely provided relative to a periphery of the second wall portion 1243. The second wall portion 1243 is provided with a blocking surface 1244, and the blocking surface 1244 is connected to the first wall portion 1242. The pin hole 104 includes a protrusion 1043 located in front of the blocking surface 1244.

Figure 18:
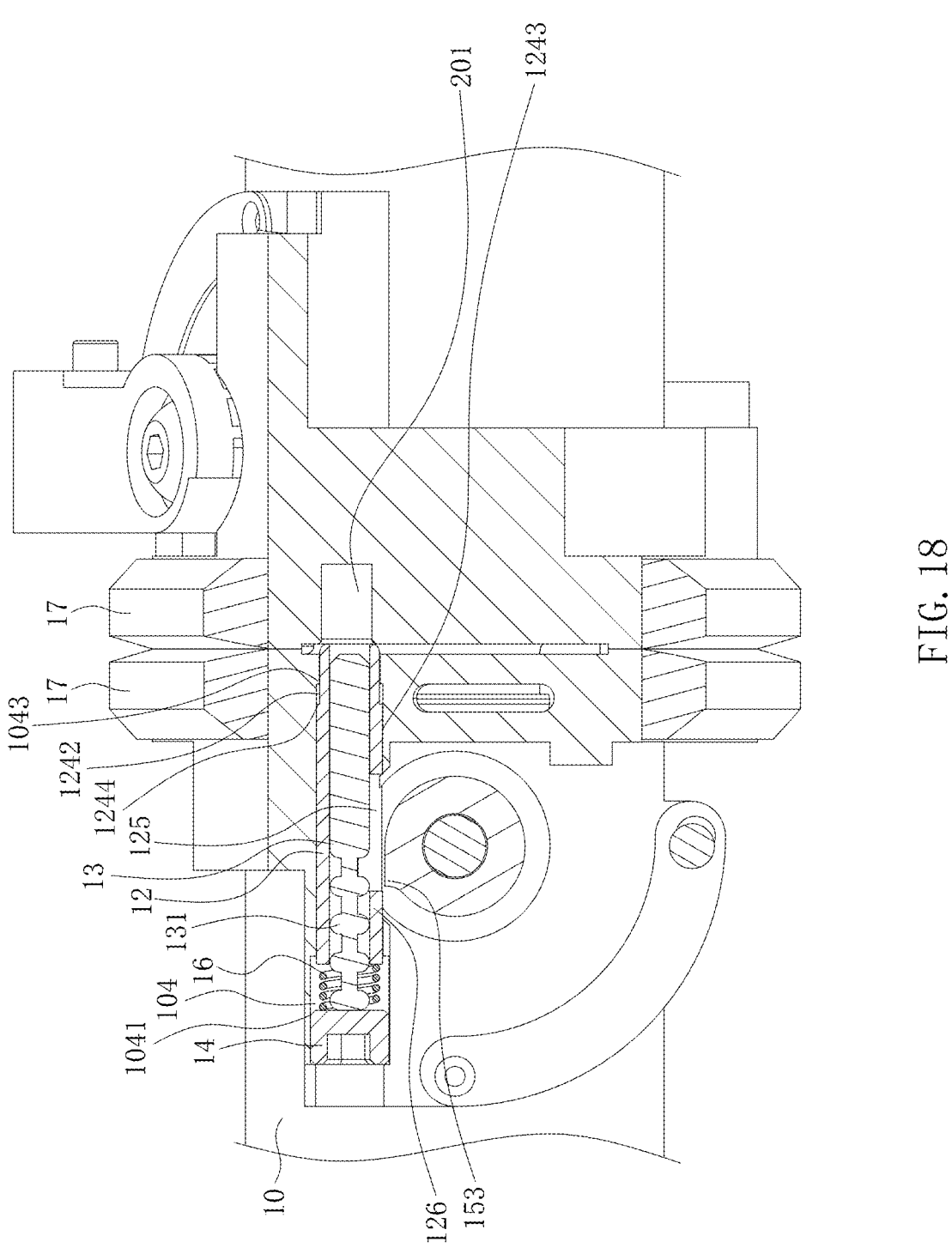
FIG. 18 is a sectional view of the fluid connector after mating with the complementary connector in FIG. 17.

As shown in FIG. 17 to FIG. 18, in the present embodiment, the surrounding wall 124 includes a stopping portion 126 connected forward to the reserved slot 125, and the driving member 15 includes a protruding block 153 protruding outward. When the first pin 12 is in the locking position, the stopping portion 126 stops the protruding block 153 to stop the driving member 15 from rotating. When the first pin 12 is in the unlocking position, the stopping portion 126 retreats backward, and the reserved slot 125 provides a reserved space for the protruding block 153 to allow the driving member 15 to rotate. In other embodiments, the surrounding wall 124 protrudes outward to form a stopping portion 126, and the driving member 15 is provided with a notch 154 which is concavely provided inward. When the first pin 12 is in the locking position, the stopping portion 126 is engaged in the notch 154 to stop the driving member 15 from rotating. When the first pin 12 is in the unlocking position, the stopping portion 126 retreats backward to be away from the notch 154 to allow the driving member 15 to rotate.

Figure 16:
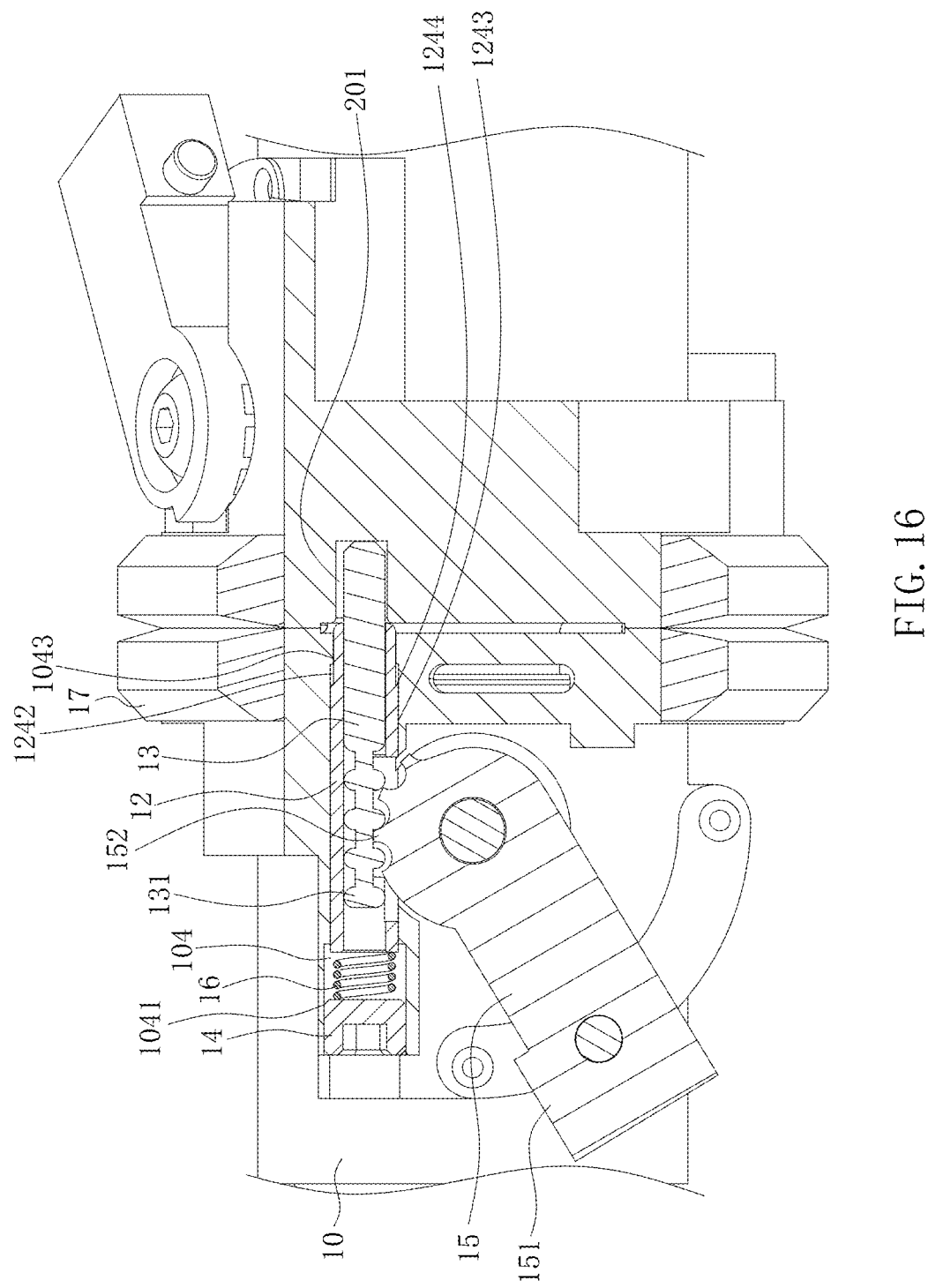
FIG. 16 is a sectional view of the fluid connector after mating with the complementary connector in FIG. 14.

As shown in FIG. 15 to FIG. 16, the second pin 13 is accommodated in the accommodating slot 123 and the pin hole 104. The second pin 13 is movable within the pin hole 104 along the front-rear direction. A rear end of the second pin 13 includes a pawl 131 along the front-rear direction. The driving member 15 includes a gear plate 152, and the gear plate 152 is adjacent to the protruding block 153 in the direction of the axis X. The gear plate 152 passes through the reserved slot 125 and enters the accommodating slot 123, and the gear plate 152 and the pawl 131 mesh with each other, allowing the driving member 15 to rotate around the axis X to drive the second pin 13 to move within the pin hole 104 in the front-rear direction.

As shown in FIG. 15 to FIG. 16, the elastic member 16 is accommodated in the pin hole 104. One end of the elastic member 16 abuts against the rear cover 14, which is located at the opening 1041, and the other end of the elastic member 16 abuts against the first pin 12. When the first pin 12 is in the locking position, the rear end surface 122 of the first pin 12 is located behind the location of the gear plate 152 and the pawl 131 meshing with each other. When the first pin 12 is in the closed position, the rear end of the second pin 13 passes backward beyond the rear end surface 122.

The mating and the detaching processes of the fluid connector 100 and the complementary connector 200 are as follows:

As shown in FIG. 15 and FIG. 17, prior to the mating of the fluid connector 100 and the complementary connector 200, a front end of the first pin 12 protrudes forward out of the pin hole 104, and the first pin 12 maintains in the locking position. At this time, the first wall portion 1242 protrudes forward out of the pin hole 104, and the protrusion 1043 abuts backward against the blocking surface 1244 to stop the first pin 12 from moving forward, and the stopping portion 126 stops the protruding block 153 to stop the driving member 15 from rotating. The driving member 15 stops rotating, which causes the second pin 13 to stop moving in the pin hole 104. That is, the valve core 11 is in the closed position, and the first pin 12 stops the valve core 11 from rotating from the closed position to the open position. When the valve core 11 is in the closed position, the second pin 13 is in the pin hole 104, a front end of the second pin 13 is accommodated in the accommodating slot 123, and a rear end of the second pin 13 protrudes backward out of the accommodating slot 123.

As shown in FIG. 16 and FIG. 18, when the fluid connector 100 is mated with the complementary connector 200, the complementary connector 200 abuts against the first pin 12, such that the first pin 12 moves backward within the pin hole 104 until the first pin 12 maintains in the unlocking position. Then, the complementary connector 200 rotates relative to the fluid connector 100, and the second pin 13 is aligned with the positioning hole 201 of the complementary connector 200. When the first pin 12 is in the unlocking position, the stopping portion 126 has retreated to a location where it cannot stop the protruding block 153, and the reserved slot 125 provides a reserved space for the protruding block 153 to allow the driving member 15 to rotate. That is, the first pin 12 is used to allow the valve core 11 to rotate from the closed position to the open position, and in the rotating process of the valve core 11 from the closed position to the open position, the front end of the second pin 13 moves forward to protrude out of the accommodating slot 123 and the pin hole 104, and the front end of the second pin 13 is accommodated in the positioning hole 201 of the complementary connector 200.

Prior to the detaching of the fluid connector 100 and the complementary connector 200, the driving member 15 drives the valve core 11 to rotate from the open position to the closed position, and the front end of the second pin 13 moves backward to retract into the accommodating slot 123 and the pin hole 104.

When the fluid connector 100 and the complementary connector 200 detach, the complementary connector 200 is released from abutting against the first pin 12, such that the first pin 12 moves forward within the pin hole 104 by the abutting of the elastic member 16. In the moving process of the first pin 12 from the unlocking position to the locking position, the stopping portion 126 moves forward. When the first pin 12 is maintained in the locking position, the protrusion 1043 abuts backward against the blocking surface 1244 to stop the first pin 12 from moving forward, and the stopping portion 126 stops the protruding block 153 to stop the driving member 15 from rotating. That is, the valve core 11 is in the closed position, and the first pin 12 stops the valve core 11 from rotating from the closed position to the open position.

In sum, the fluid connector according to certain embodiments of the present invention has the following beneficial effects:

1. The first pin 12 is provided to be accommodated in the pin hole 104, and the first pin 12 moves between the locking position and the unlocking position. The first pin 12 includes the front end surface 121 and the accommodating slot 123 running through the front end surface 121. The second pin 13 is accommodated in the accommodating slot 123 and the pin hole 104, and the second pin 13 is movable in the front-rear direction, such that the first pin 12 and the second pin 13 share the same pin hole 104, and the second pin 13 occupies at least a portion of the inner space of the first pin 12, thereby facilitating saving the space of the shell 10.

2. The first pin 12 includes a surrounding wall 124 and a reserved slot 125 running through the surrounding wall 124, thus providing a reserved space for the gear plate 152, allowing the gear plate 152 to enter the accommodating slot 123 to mesh with the pawl 131, thereby driving the pawl 131 to moving in the front-rear direction.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A fluid connector, comprising:

a shell, comprising a mating surface, and a pin hole and a fluid channel respectively extending along an axial direction and running through the mating surface, wherein the mating surface is located at a front end of the shell and is mated with a complementary connector;

a valve core, configured to rotate between a closed position blocking the fluid channel and an open position opening the fluid channel;

a first pin, accommodated in the pin hole, wherein the first pin moves between a locking position and an unlocking position in a front-rear direction, and the first pin comprises a front end surface and an accommodating slot running through the front end surface; and a second pin, accommodated in the accommodating slot and the pin hole, wherein the second pin is movable in the front-rear direction;

wherein prior to mating of the fluid connector and the complementary connector, a front end of the first pin protrudes forward out of the pin hole, the first pin maintains in the locking position, the valve core is in the closed position, the first pin stops the valve core from rotating from the closed position to the open position, and when the valve core is in the closed position, the second pin is in the pin hole and a front end of the second pin is accommodated in the accommodating slot;

wherein when the fluid connector is mated with the complementary connector, the complementary connector abuts against the first pin, such that the first pin moves backward within the pin hole until the first pin maintains in the unlocking position, when the first pin is in the unlocking position, the first pin is configured to allow the valve core to rotate from the closed position to the open position, and in a rotating process of the valve core from the closed position to the open position, the front end of the second pin moves forward to protrude out of the accommodating slot and the pin hole, and the front end of the second pin is accommodated in the complementary connector.

2. The fluid connector according to claim 1, further comprising a driving member, wherein:

the driving member and the valve core are fixed to each other, and the driving member rotates to drive the valve core to rotate;

the driving member comprises a protruding block protruding outward;

the first pin comprises a surrounding wall and a reserved slot running through the surrounding wall, the accommodating slot is surrounded by the surrounding wall, the reserved slot is in communication with the accommodating slot, and the surrounding wall comprises a stopping portion connected forward to the reserved slot;

when the first pin is in the locking position, the stopping portion stops the protruding block to stop the driving member from rotating; and when the first pin is in the unlocking position, the stopping portion retreats backward, and the reserved slot provides a reserved space for the protruding block to allow the driving member to rotate.

3. The fluid connector according to claim 1, wherein:

the first pin comprises a surrounding wall, and the accommodating slot is surrounded by the surrounding wall;

the surrounding wall comprises a first wall portion and a second wall portion connected forward to the first wall portion, the second wall portion protrudes outward relative to a periphery of the first wall portion to form a blocking surface; and the blocking surface is connected to the first wall portion;

the pin hole comprises a protrusion located in front of the blocking surface; and when the first pin is in the locking position, the first wall portion protrudes forward out of the pin hole, and the protrusion abuts backward against the blocking surface to stop the first pin from moving forward.

4. The fluid connector according to claim 1, wherein the pin hole comprises an opening running backward therethrough, the first pin is assembled forward into the pin hole from the opening, a rear cover is located at the opening, an elastic member is accommodated in the pin hole, one end of the elastic member abuts against the rear cover, and the other end of the elastic member abuts against the first pin.

5. The fluid connector according to claim 1, further comprising a driving member, wherein:

the driving member and the valve core are fixed to each other, and the driving member rotates to drive the valve core to rotate;

the driving member comprises a gear plate;

the first pin comprises a surrounding wall and a reserved slot running through the surrounding wall, the accommodating slot is surrounded by the surrounding wall, and the reserved slot is in communication with the accommodating slot;

a rear end of the second pin comprises a pawl along the axial direction, the gear plate passes through the reserved slot and enters the accommodating slot, and the gear plate and the pawl mesh with each other; and the driving member rotates to drive the second pin to move in the front-rear direction.

6. The fluid connector according to claim 5, wherein the surrounding wall comprises a blocking surface connected forward to the reserved slot, and when the first pin is in the locking position, the gear plate abuts backward against the blocking surface to stop the first pin from moving forward.

7. The fluid connector according to claim 1, further comprising a driving member, wherein:

the driving member and the valve core are fixed to each other, and the driving member rotates to drive the valve core to rotate;

the driving member comprises a notch concavely provided inward;

the first pin comprises a surrounding wall and a stopping portion protruding outward from the surrounding wall, and the accommodating slot is surrounded by the surrounding wall;

when the first pin is in the locking position, the stopping portion is engaged in the notch to stop the driving member from rotating; and when the first pin is in the unlocking position, the stopping portion retreats backward to be away from the notch to allow the driving member to rotate.

8. The fluid connector according to claim 7, wherein the pin hole comprises a stopping surface located in front of the stopping portion, and when the first pin is in the locking position, the stopping surface abuts backward against the stopping portion to stop the first pin from moving forward.

9. The fluid connector according to claim 1, wherein the first pin comprises a rear end surface, the accommodating slot runs backward through the rear end surface, and prior to mating of the fluid connector and the complementary connector, a rear end of the second pin is located in the accommodating slot.

10. The fluid connector according to claim 9, wherein along the front-rear direction, a dimension of the second pin is smaller than a dimension of the first pin.

* * * * *